(12) United States Patent
Sendelbach et al.

(10) Patent No.: US 7,503,582 B2
(45) Date of Patent: Mar. 17, 2009

(54) MULTIPART AIRBAG CUTTING FOR AN AIRBAG OF AN OCCUPANT PROTECTION DEVICE FOR MOTOR VEHICLES AND METHOD FOR PRODUCING AN AIRBAG FROM SAID AIRBAG CUTTING

(75) Inventors: Hans-Peter Sendelbach, Senden (DE); Christian Weyrich, Neu-Ulm (DE)

(73) Assignee: Takata Corporation, Tokyo (JP)

( * ) Notice: Subject to any disclaimer, the term of this patent is extended or adjusted under 35 U.S.C. 154(b) by 426 days.

(21) Appl. No.: 10/516,027

(22) PCT Filed: May 26, 2003

(86) PCT No.: PCT/DE03/01759

§ 371 (c)(1), (2), (4) Date: Jun. 22, 2005

(87) PCT Pub. No.: WO03/101788

PCT Pub. Date: Dec. 11, 2003

(65) Prior Publication Data

US 2006/0071458 A1    Apr. 6, 2006

(30) Foreign Application Priority Data

May 28, 2002 (DE) ............................... 102 23 830

(51) Int. Cl.
*B60R 21/16* (2006.01)
(52) U.S. Cl. ............. 280/743.1; 280/729; 280/743.2
(58) Field of Classification Search ............ 280/729, 280/743.1, 743.2
See application file for complete search history.

(56) References Cited

U.S. PATENT DOCUMENTS

| 5,282,646 | A | | 2/1994 | Melvin et al. |
| 5,520,414 | A | * | 5/1996 | Bishop ............ 280/743.1 |
| 5,577,765 | A | | 11/1996 | Takeda et al. |
| 5,582,429 | A | | 12/1996 | Heinz et al. |
| 5,586,782 | A | | 12/1996 | Zimmerman |
| 5,683,109 | A | | 11/1997 | Birman |
| 5,791,685 | A | | 8/1998 | Lachat et al. |

(Continued)

FOREIGN PATENT DOCUMENTS

DE    41 42 326 A1    6/1993

(Continued)

OTHER PUBLICATIONS

Patent Abstracts of Japan, No. 10273010 A, Nissan Motor Co., LTD., (Oct. 13, 1998).

(Continued)

*Primary Examiner*—Toan C To
(74) *Attorney, Agent, or Firm*—Foley & Lardner LLP

(57) ABSTRACT

The invention relates to an airbag cutting for an airbag of an occupant protection device for motor vehicles. Said cutting comprises two deployed, mutually overlapping airbag parts (1, 2; 3, 4) that are linked with each other in the area of overlap (U), and a folding axis (A) about which the two airbag parts (1, 2; 3, 4) can be folded in such a manner as to form an airbag having two separate compartments (K1, K2; K3, K4) by linking the airbag sections that lie one on top of the other after folding.

36 Claims, 10 Drawing Sheets

U.S. PATENT DOCUMENTS

| | | | |
|---|---|---|---|
| 5,865,467 A * | 2/1999 | Bito et al. ................. 280/743.1 |
| 5,906,391 A | 5/1999 | Weir et al. |
| 5,927,748 A | 7/1999 | O'Driscoll |
| 5,975,564 A | 11/1999 | Smith et al. |
| 5,975,571 A * | 11/1999 | Ford et al. ............... 280/743.1 |
| 6,059,312 A | 5/2000 | Staub et al. |
| 6,086,092 A | 7/2000 | Hill |
| 6,364,348 B1 | 4/2002 | Jang et al. |
| 6,439,606 B2 * | 8/2002 | Okada et al. ............. 280/743.1 |
| 6,478,329 B1 * | 11/2002 | Yokoyama ................. 280/729 |
| 6,692,023 B2 * | 2/2004 | Tokita et al. ............. 280/743.1 |
| 6,832,779 B2 * | 12/2004 | Tajima et al. ............ 280/743.1 |
| 6,916,039 B2 * | 7/2005 | Abe .......................... 280/729 |
| 6,951,351 B2 * | 10/2005 | Watanabe ................ 280/743.1 |
| 7,000,943 B2 * | 2/2006 | Hasebe et al. ................ 280/729 |
| 7,000,947 B2 * | 2/2006 | Kumagai et al. ......... 280/743.1 |
| 7,073,818 B2 * | 7/2006 | Hasebe ....................... 280/729 |
| 7,303,208 B2 * | 12/2007 | Johansson et al. ........ 280/743.1 |

FOREIGN PATENT DOCUMENTS

| | | |
|---|---|---|
| DE | 295 18 651 U1 | 4/1996 |
| DE | 195 05 507 A1 | 8/1996 |
| DE | 199 31 028 A1 | 1/2000 |
| EP | 0 658 459 B1 | 1/1994 |
| EP | 0 775 614 A2 | 5/1997 |
| JP | 11245757 A | 9/1999 |
| JP | 2000-52913 | 2/2000 |
| JP | 2001-114060 A | 4/2001 |
| JP | 2001-213262 A | 8/2001 |
| WO | WO 00/35721 A1 | 6/2000 |

OTHER PUBLICATIONS

Patent Abstracts of Japan, No. 2000052913, Toshiki, (Aug. 10, 1998).

* cited by examiner

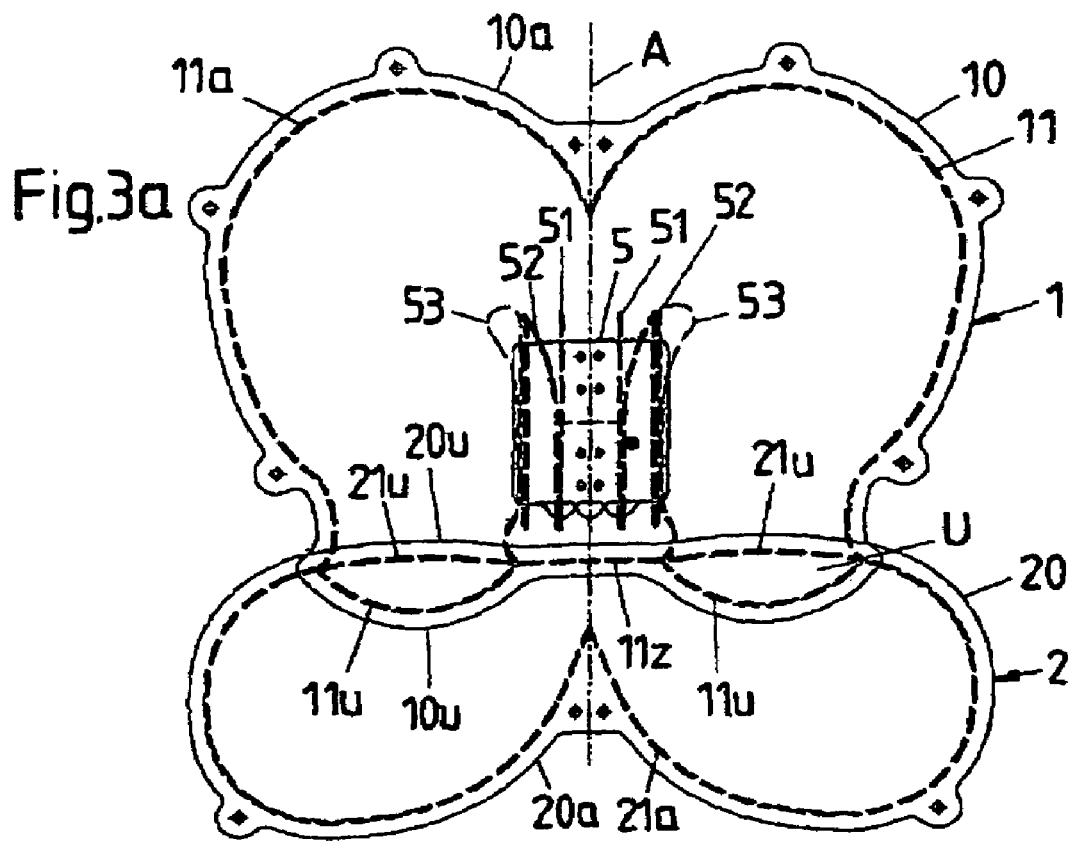
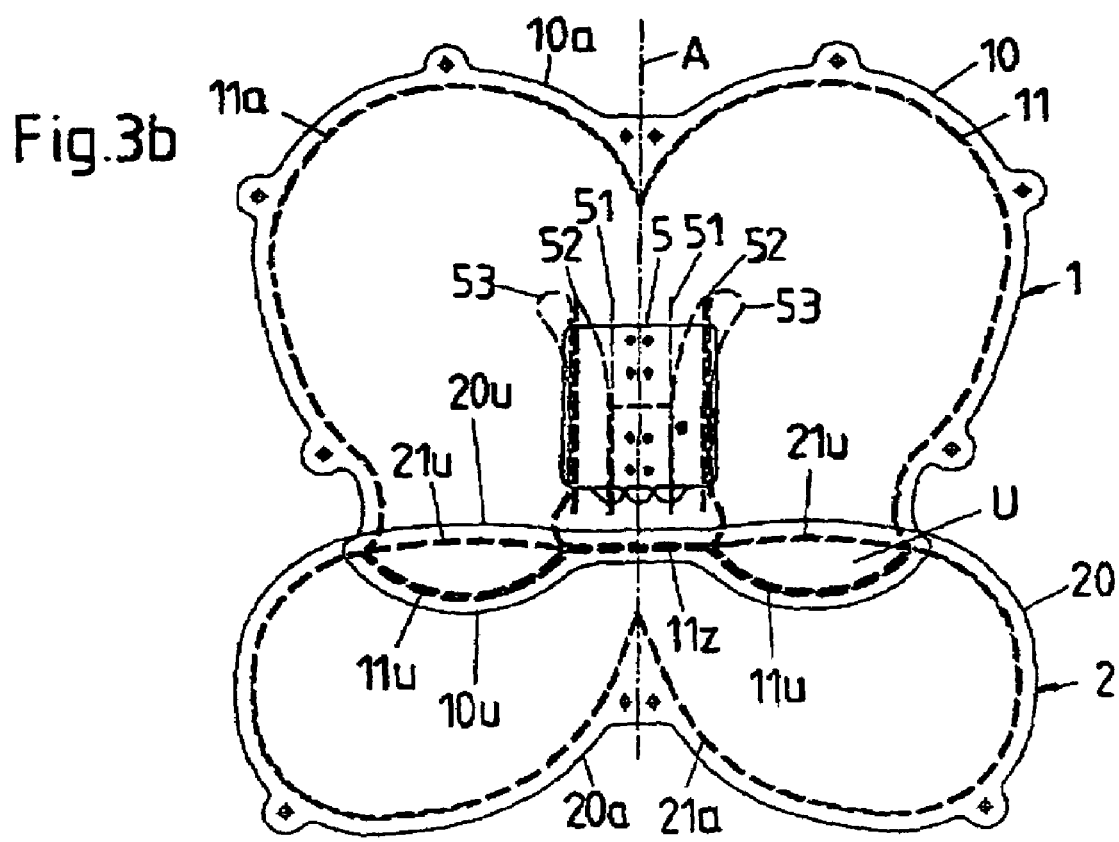

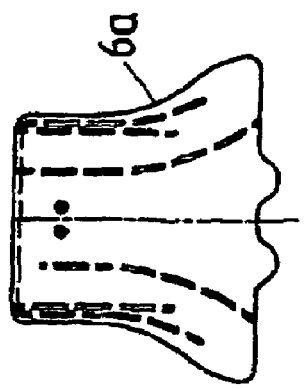
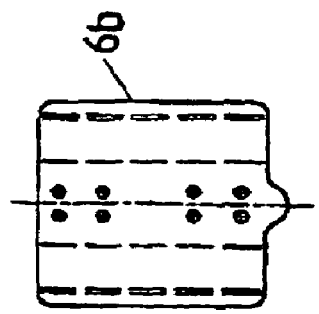
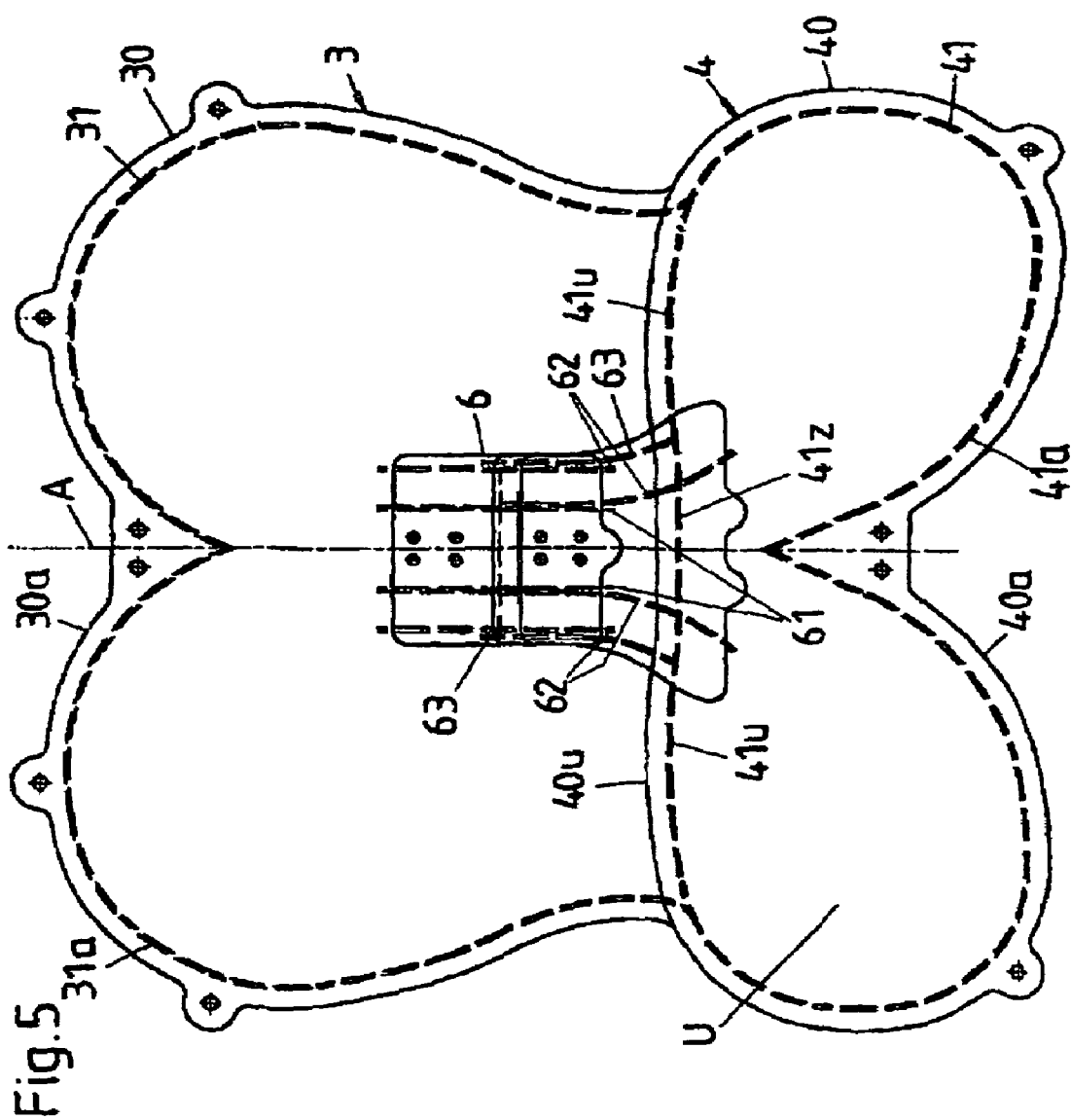

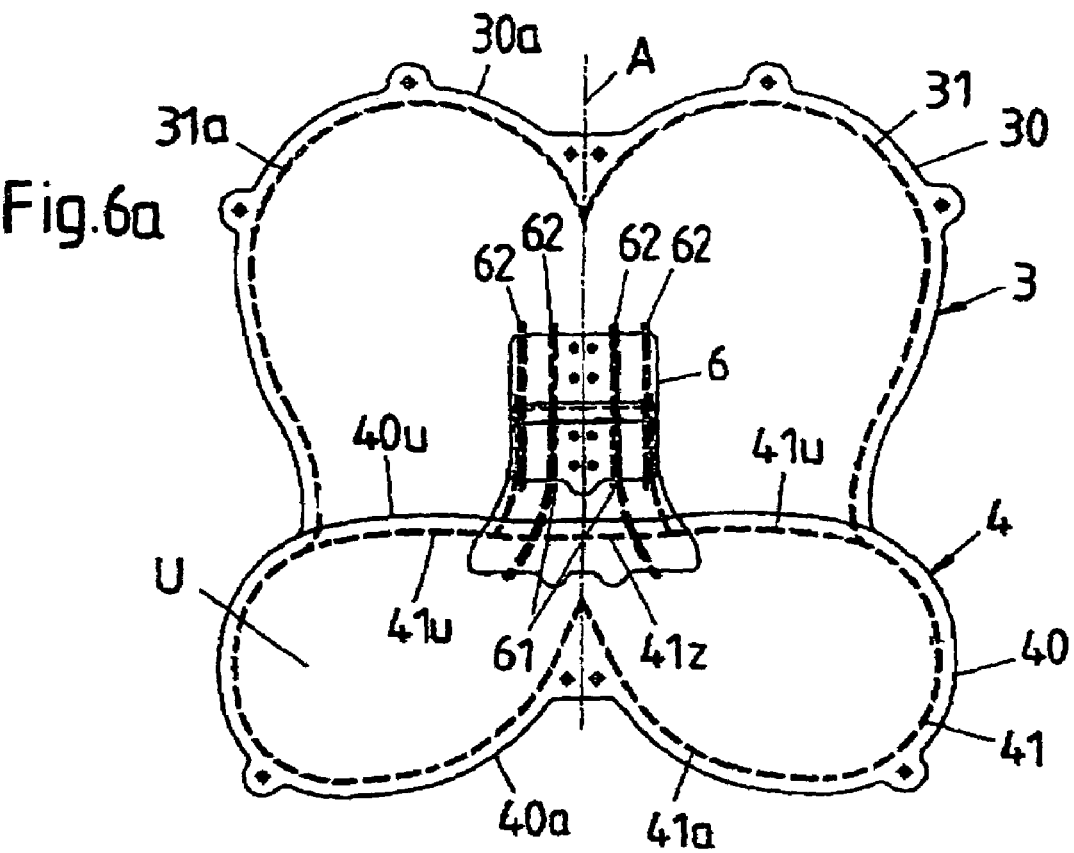
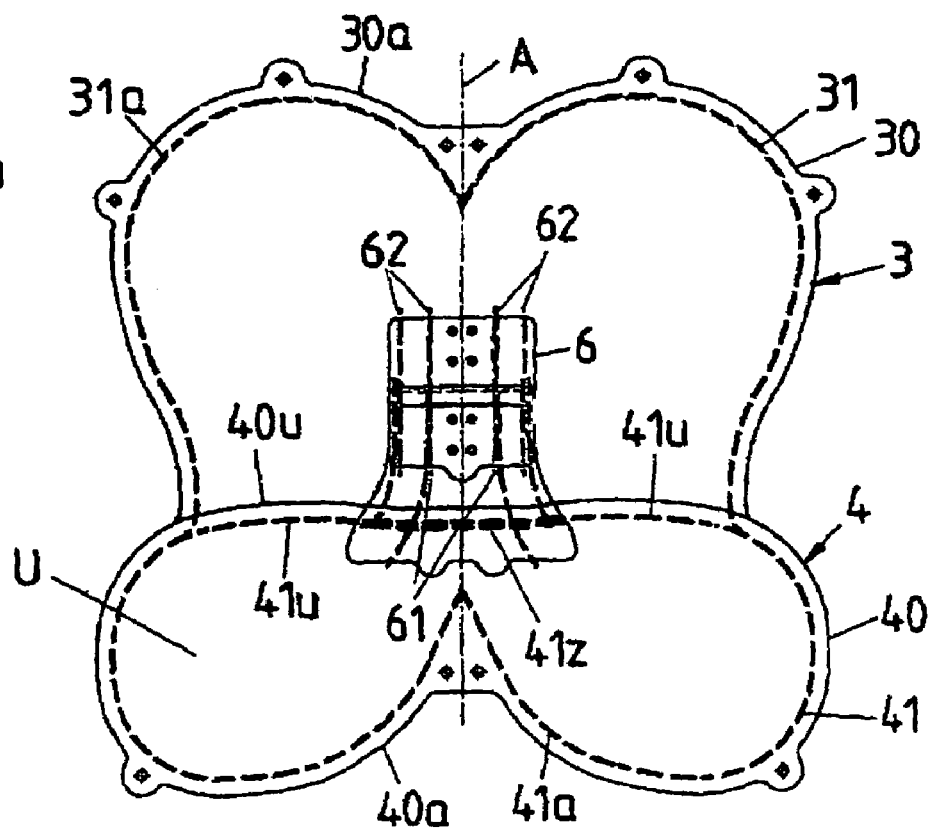

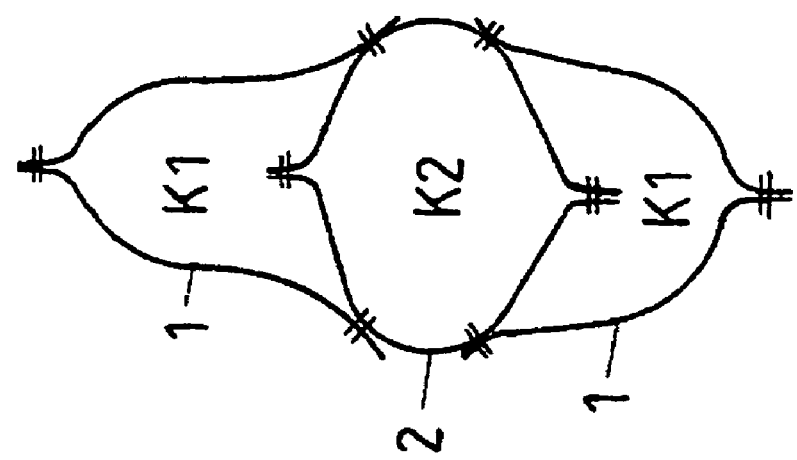
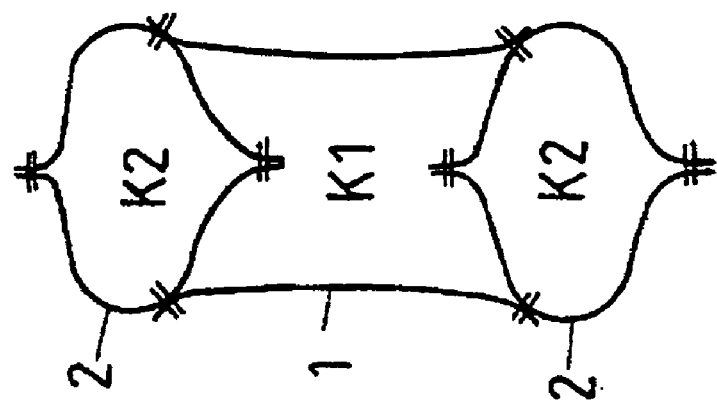
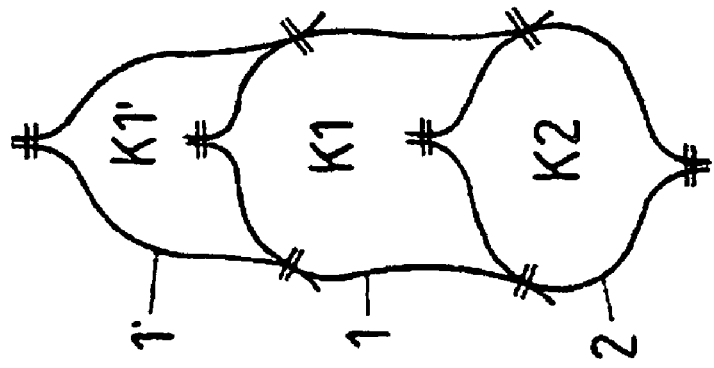

MULTIPART AIRBAG CUTTING FOR AN AIRBAG OF AN OCCUPANT PROTECTION DEVICE FOR MOTOR VEHICLES AND METHOD FOR PRODUCING AN AIRBAG FROM SAID AIRBAG CUTTING

BACKGROUND

The invention relates to a multipart airbag cutting for an airbag of an occupant protection device for motor vehicles and to a method for producing an airbag from such an airbag cutting.

An airbag cutting of the generic type is designed to produce an airbag for an occupant protection device, which airbag is formed by at least two chambers which are separated from each other and which, after the inflation of the airbag, can be at a different pressure. The two chambers do not have to be separated from each other in an entirely gastight manner; rather, they may entirely communicate with each other by means of one or more openings in a corresponding partition. However, these openings have to be restricted in their cross section in such a manner that a different internal pressure can be maintained in the chambers at least for the period of time in which the airbag is to deploy its protective potential as a restraint device for a motor vehicle occupant.

The use of airbags having a plurality of chambers which differ in geometry and, in the inflated state, can have a different internal pressure is of significance, for example in the case of side air bags which may serve to protect the head, the thorax region, the abdomen region and the pelvis region of a vehicle occupant. For optimum protection of these different body parts from injury, airbag regions differing in geometry and having a different internal pressure are required in each case. Thus, for example, a chamber of the airbag that is provided for protecting the pelvis region is to have a greater internal pressure than a chamber provided for protecting the thorax region.

The invention is based on the problem of providing an airbag cutting of the type mentioned at the beginning and a method for producing an airbag from an airbag cutting of this type, which enable the production of an airbag, the chambers of which are connected stably to one another, using means which are as simple as possible.

This problem is solved in respect of the airbag cutting by the features of patent claim 1.

According to them, the airbag cutting has two airbag parts which, in the spread-out state, overlap each other and can be connected to each other in particular in the overlapping region, so that the overlapping region forms a boundary surface (partition) between two chambers of the inflated airbag, which can be produced by connecting the edges of the particular airbag cutting. Expressed in other words, each of the at least two airbag cuttings is firstly sewn or connected in some other manner along its outer edge in such a manner that an (open or closed) covering for a chamber of the airbag is formed from the particular airbag cutting; furthermore, the two airbag parts are additionally connected to each other in the overlapping region in such a manner that a partition (boundary surface) is formed between the two chambers and the two chambers can be supported stably on each other in this region.

The solution according to the invention has the advantage of enabling the production of a multichamber airbag from a two-dimensional airbag cutting in a simple manner, it also being possible to carry out the connections between the individual airbag parts of the cutting (by sewing) on the airbag, which is spread out flat and two-dimensionally, or on the airbag cutting which is in turn extended in one plane after sections of the airbag cutting are placed one over the other. The partition between the two chambers of the airbag produced from this airbag cutting is defined here in a simple manner by the overlapping region of the two airbag parts. The size of the overlapping region of the two airbag parts and the profile of the connecting points (connecting seams) between the two airbag parts also determines the stability of the airbag, in particular in respect of avoiding a tilting of the individual chambers toward each other. That is to say, the two airbag parts and the chambers, which are enclosed by the airbag in the inflated state thereof, can be aligned with respect to each other in a stable manner in the overlapping region, in which the two airbag parts are connected to each other.

In this case, the connecting line, along which the two airbag parts are connected to each other in the overlapping region, can annularly enclose the boundary surface between the two chambers of the airbag in the inflated state.

The connection of the two airbag parts in the overlapping region, in particular the connecting line annularly enclosing the partition (boundary surface) between the two chambers, can be formed, on the one hand, by additional connecting means, for example in the form of a seam or adhesive, or, on the other hand or in addition, by the fact that, in the inflated state of the airbag, a significantly higher pressure prevails in one chamber than in the other chamber, with the result that the first chamber is pressed along the connecting line toward the other chamber.

The connecting lines which are formed by additional connecting means, for example in the form of a seam, are provided by appropriate connection of the airbag parts forming the airbag cutting before the airbag is inflated. By contrast, the connecting lines formed by the differences in the internal pressure in the individual chambers of the airbag are not produced until the airbag is being inflated. The differences in pressure required for this can be produced in a known manner by a quantity of compressed gas that is required for producing the internal pressure desired in each case being introduced from the gas generator, which is used for inflating the airbag, into the corresponding chamber of the airbag.

The two parts of the airbag cutting are preferably designed and arranged in such a manner that, in the inflated state of the airbag, one part of the airbag cutting rests in a bell- or hood-shaped manner on the covering of the other, second chamber, the covering of the second chamber, including the boundary surface between the two chambers, being formed by the other, second airbag part.

SUMMARY

In one embodiment, the airbag cutting has a folding axis around which the two airbag parts can be folded (folded over) together in such a manner that by connection of the airbag sections, which lie one over the other after the folding or folding over, an airbag having two chambers separated from each other is formed. In this connection, a section (at least) of one of the two airbag parts, which section is situated in the overlapping region of the two airbag parts, forms a partition by means of which the two chambers of the airbag are separated from each other. The folding axis is preferably an axis of symmetry of the two airbag parts.

In the overlapping region of the two airbag parts one airbag part is preferably connected to the other airbag part along its outer edge, i.e. the connecting points of one airbag part to the other airbag part are situated in the overlapping region adjacent to the outer edge of the first airbag part in such a manner that no further fastening points for connecting sections of the airbag are situated between said connecting points and that outer edge.

By contrast, the connecting points of the other airbag part in the overlapping region are preferably spaced apart from the outer edge of the other airbag part in such a manner that further fastening points for connecting airbag sections are situated between these connecting points and the outer edge of the other airbag part.

The effect which can be achieved by the previously described arrangement of the connecting points between the two airbag parts in the overlapping region of the two airbag parts is that, after production of the airbag, a section of one of the two airbag parts, which section lies in the overlapping region, forms the partition by means of which the two chambers of the airbag are separated from each other.

According to one embodiment of the invention, one airbag part is connected here to the other airbag part by means of its entire outer edge, which lies in the overlapping region. According to another embodiment, one airbag part is connected to the other airbag part only along a subsection of its outer edge lying in the overlapping region, to be precise in particular with a central subsection. The first-mentioned variant is suitable in particular for providing an airbag in which, in order to form a first chamber, one airbag part is placed onto the other airbag part, which forms a second chamber, with part of the covering of the other airbag part, which encloses the second chamber, at the same time also forming part of the covering of the first chamber. By contrast, the second variant is suitable in particular for providing an airbag, in which one airbag part encloses a first chamber which is situated as a "bag in the bag" within the chamber enclosed by the second airbag part, the first airbag part at the same time forming the partition between the two chambers.

Depending on the desired geometry and arrangement of the chambers of the airbag, it is possible for the two airbag parts to only partially overlap in the overlapping region or it is possible for one of the two airbag parts to be situated entirely in the overlapping region. In addition, a holder for a gas generator, for example in the form of a fabric pocket, can be fastened to one of the two airbag parts.

After the two airbag parts, which are already connected to each other along defined connecting points, are folded over or folded, the airbag sections which are then situated one above the other are connected to each other exclusively along their outer edges, to be precise preferably along the entire outer edge, thus producing the desired multichamber airbag.

Both the connection of the airbag parts to each other before the airbag parts are folded over with respect to the folding axis and also the subsequent connection of the airbag sections lying one above the other after the folding-over process are preferably produced by sewing.

The two chambers of the airbag can be connected to each other via an opening in the partition of the two chambers, it also being possible at the same time for the gas generator to be arranged in the region of this opening, so that, depending on the desired pressure ratios in the individual chambers, defined quantities of gas are admitted into one chamber and the other chamber.

According to the invention, a plurality of parts of an airbag cutting, in particular more than two parts, can also be connected to one another in the manner according to the invention such that, in the inflated state, the airbag has three or more chambers.

An airbag which can be produced in a simple manner by means of an airbag cutting according to the invention is characterized by the features of patent claim 34. It is distinguished by the fact that it comprises at least two chambers, the covering of the first chamber being placed onto the covering of the second chamber and the covering of the first chamber being designed to be open in the region in which the two chambers are adjacent to each other, with the result that there only the covering of the second chamber forms the partition between the two chambers of the airbag.

A method for producing an airbag by means of an airbag cutting according to the invention is characterized by the features of patent claim 36. According to them, the two airbag parts, which are spread out and overlap each other here, are connected to each other in the overlapping region, the two airbag parts are subsequently folded, for example around an axis, so that the airbag sections, which were previously positioned on both sides of the axis, are now situated one above the other, and the airbag sections which are situated one above the other are then connected to each other (along their outer edge), so that an airbag having at least two chambers is formed.

BREIF DESCRIPTION OF THE DRAWINGS

Further features and advantages of the invention will become clear in the following description of exemplary embodiments with reference to the figures, in which:

FIG. 1b shows a side view of the airbag from FIG. 1a;

FIG. 1c shows a perspective illustration of the airbag from FIG. 1a;

FIGS. 3a-3d show four steps during the production of an airbag according to FIGS. 1a to 1c from a cutting according to FIG. 2;

FIG. 4b shows a side view of the airbag from FIG. 4a;

FIG. 5 shows an airbag cutting, comprising two airbag parts connected to each other in an overlapping region, for producing the airbag according to FIGS. 4a and 4b;

FIGS. 5a and 5b show two fabric parts for forming a holder for a gas generator on the airbag cutting from FIG. 5;

FIGS. 6a-6d show four steps during the production of an airbag according to FIGS. 4a and 4b from an airbag cutting according to FIG. 5;

FIGS. 7a-7f show four different embodiments of an airbag having three chambers separated from one another.

DETAILED DESCRIPTION

Figure 1A:
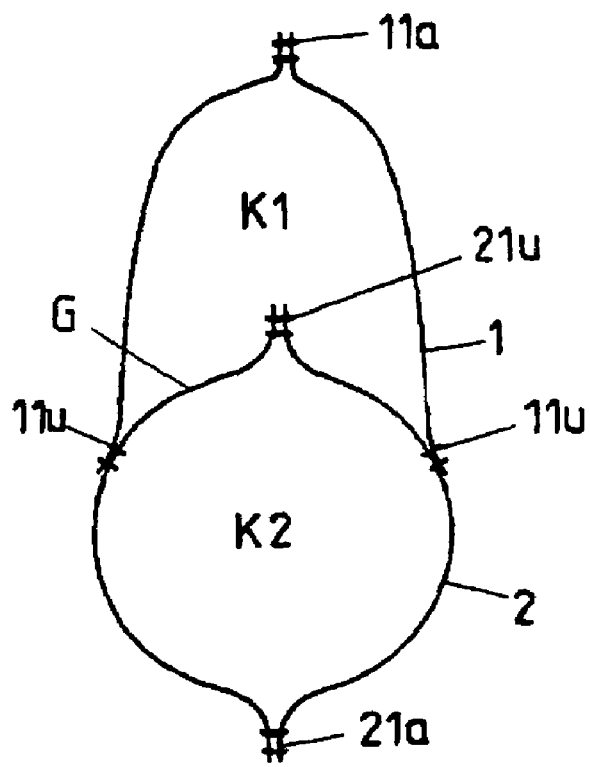
FIG. 1a shows a sectional illustration through a first exemplary embodiment of an airbag having two chambers separated from each other.
Figure 1B:
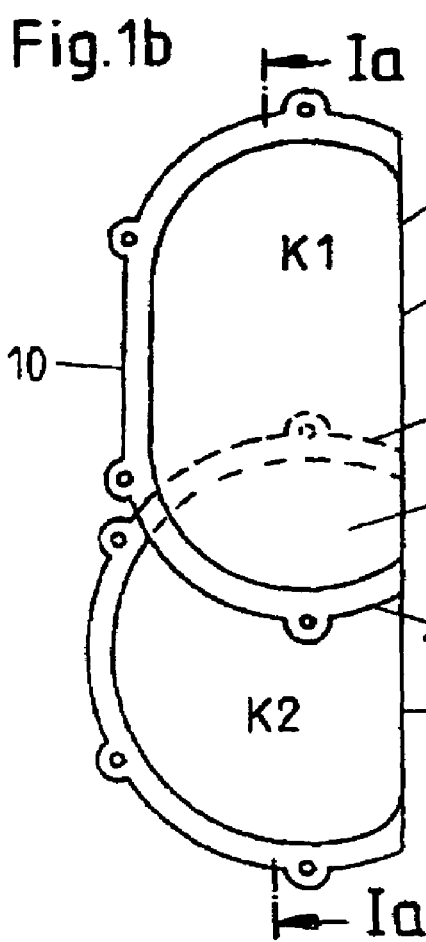
Figure 1C:
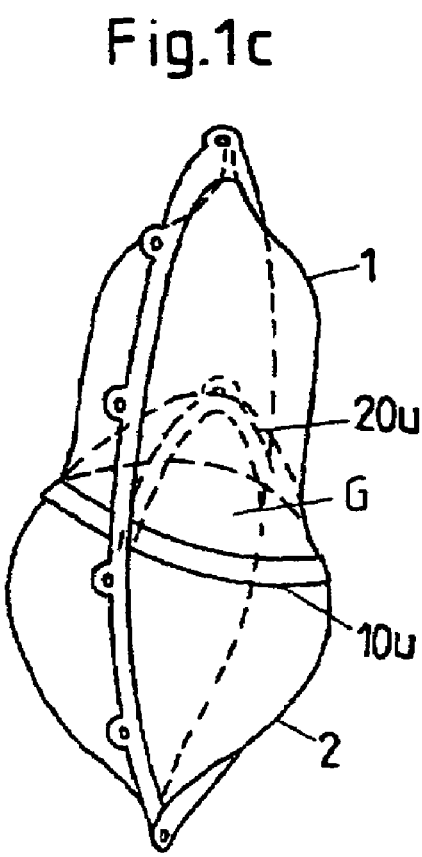

FIGS. 1a to 1c illustrate an airbag having two chambers K1, K2 which are separate from each other and the first chamber K1 of which is surrounded by a bell- or hood-shaped airbag covering 1, which is open on one side (its lower side) and the second chamber K2 of which is surrounded by an airbag covering 2 which completely encloses this chamber K2. In the region in which the first chamber K1 is adjacent to the second chamber K2, the airbag covering 2 forms a partition (boundary surface G) between the two chambers K1, K2.

The first chamber K1 is therefore bounded toward one side not only by the associated covering 1, but also by that part of the covering 2 of the second chamber K2, which part forms the partition. In the region in which the covering 1 of the first chamber K1 rests on the covering 2 of the second chamber K2, the two covers 1, 2 are sewn to each other, so that the connecting seam annularly surrounds the partition (boundary surface G).

The seams 11a, 11u, 21a, 21u which are illustrated in FIGS. 1a to 1c along which various airbag sections are connected to one another will be discussed in greater detail in the following description of the production of this airbag from the airbag cutting illustrated in FIG. 2.

Figure 2A:
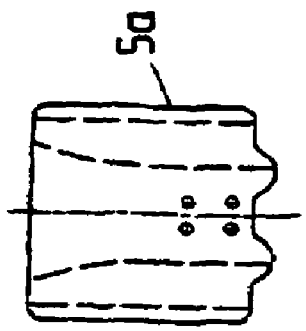
FIGS. 2a and 2b shows two fabric parts for forming a holder for a gas generator on the airbag cutting according to FIG. 2.
Figure 2B:
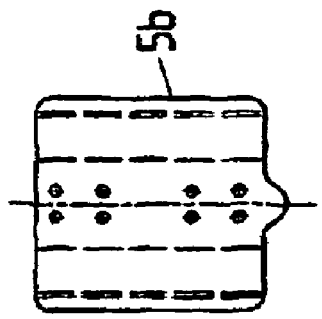
Figure 2:
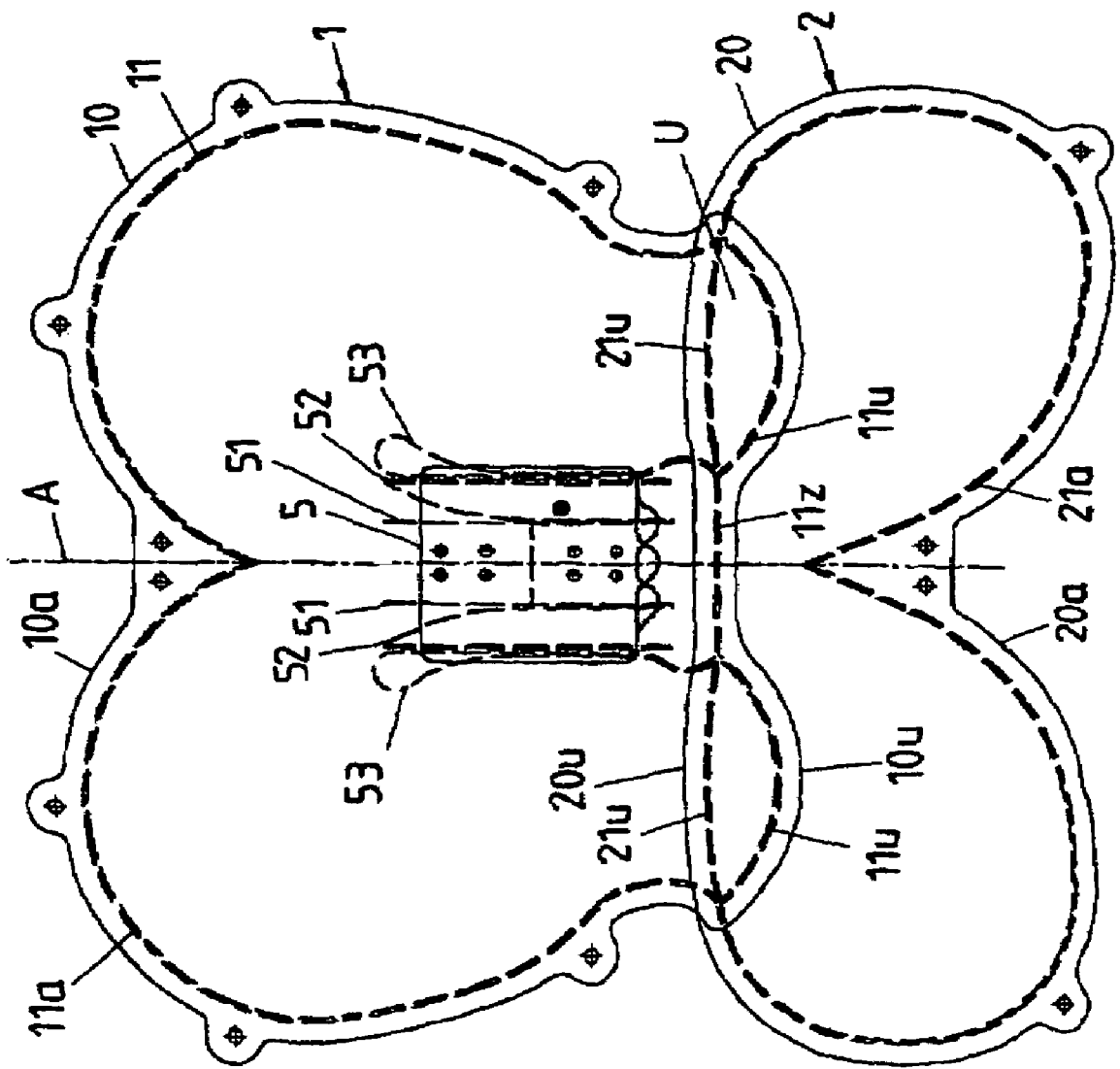
FIG. 2 shows an airbag cutting, comprising two airbag parts which are connected to each other in an overlapping region, for producing an airbag according to the FIGS. 1a to 1c.

The airbag cutting which is illustrated in FIG. 2 comprises a first airbag part 1 which, in the inflated state of the airbag according to FIGS. 1a to 1c, forms the covering of the first chamber K1 and comprises a second airbag part 2 which, in the inflated state of the airbag, forms the covering of the second chamber K2. In the state illustrated in FIG. 2, the two airbag parts 1, 2, which consist of fabric, are spread out flat, in which case they overlap in an overlapping region U and are of symmetrical design with respect to a common axis A. Two further fabric parts 5a, 5b (cf. FIGS. 2a and 2b) rest against the first airbag part 1 to form a holder 5 for a gas generator for inflating the airbag, one fabric part 5a lying on the front side (upper side) of the first airbag part 1, which is spread out flat on a base, and the other fabric part 5b lying on the rear side (i.e. the side facing the base) of the spread-out, first airbag part 1. The two fabric parts 5a, 5b form reinforcing and joining layers for the gas generator which is to be accommodated.

FIG. 2 already indicates, by means of dashed lines, the connecting lines along which sections of the airbag cutting are connected to each other to provide an airbag. The individual working steps for this are illustrated in FIGS. 3a to 3d. The connecting lines (seams) along which a connection is produced in the particular working step (by sewing) are emphasized in each case in FIGS. 3a to 3d.

To produce the airbag illustrated in FIGS. 1a to 1c from the airbag cutting shown in FIG. 2, first of all the rear fabric part 5b, which serves to hold a gas generator, is connected, according to FIG. 3a, to the first airbag part 1 along two inner seams 51 extended longitudinally. The two fabric parts 5a, 5b are then together connected to the first airbag part 1 along two outer longitudinal seams 52.

Subsequently, according to FIG. 3b, the first airbag part 1, which consists of fabric, is connected to the second airbag part 2, which consists of fabric, by the first airbag part 1 being sewn to the second airbag part along that section 10u of its outer edge 10 which lies in the overlapping region U of the two airbag parts 1, 2. The connection of the two airbag parts 1, 2 in the spread-out state therefore takes place along a seam 11u, 11z which, in the overlapping region of the two airbag parts 1, 2, extends along that section 10u of the outer edge 10 of the first airbag part 1, which section lies in the overlapping region U. This connecting seam 11u, 11z has a central seam section 11z, which extends next to the holder 5 for the gas generator, and two further seam sections 11u running on both sides of the central seam section 11z.

Figure 3C:
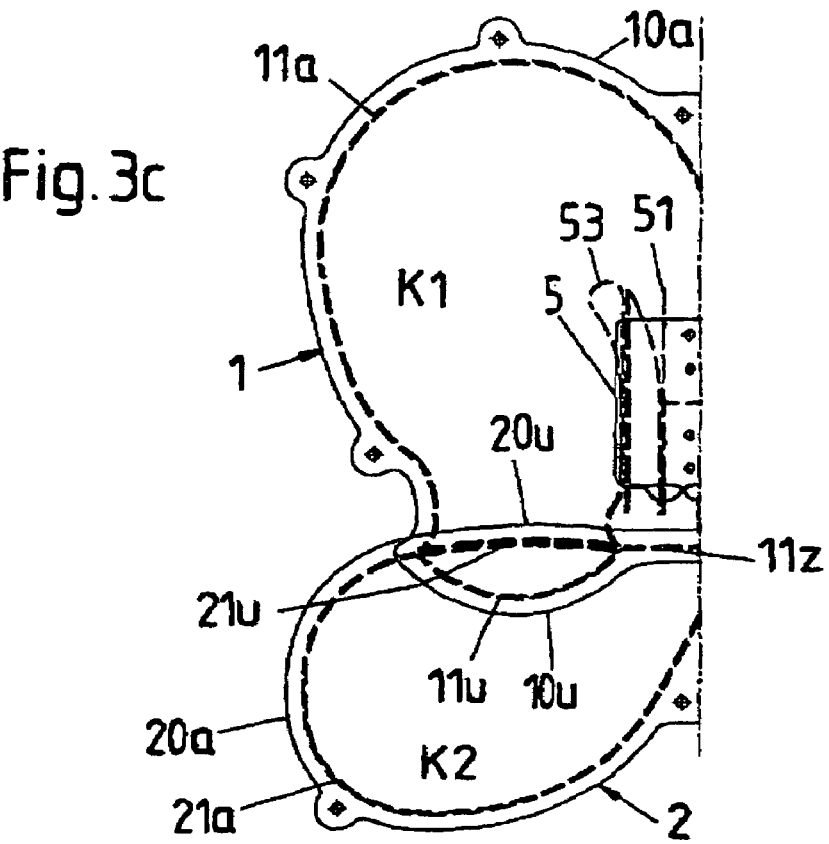

The two airbag parts 1, 2 which are connected to each other are then folded once around the folding axis A, and the airbag sections, which were previously placed on both sides of the folding axis A, are placed flat on each other, cf. FIG. 3c. Then firstly the first, upper airbag part 1 is placed over the second, lower airbag part 2, so that the subsections 20ü of the outer edge of the second airbag part 2, which subsections now rest on each other in the overlapping region U, can be connected to each other along a seam 21ü, which seams are situated outside the central seam section 11z by means of which the two airbag parts 1, 2 are connected to each other. Owing to the fact that, in the region of the central seam section 11z, there is no connection between the two sections of the second airbag part 2, which sections are situated one above the other, an opening is formed here through which the first chamber K1, which is enclosed by the first airbag part 1, is connected to the second chamber K2, which is enclosed by the second airbag part 2.

In the last working step, the two symmetrically designed sections of the first, upper airbag part 1 are again placed on each other (corresponding to FIG. 3d) and the sections of the two airbag parts 1, 2, which sections are situated one above the other, are sewn together along the entire outer contour 10a, 20a of the edges 10, 20, with the result that corresponding seams 11a, 21a run parallel to the outer contour 10a, 20a. In addition, a bearing seam 53 for the gas generator is sewn on the holder 5 for the gas generator.

The result of the working steps described starting from the airbag cutting illustrated in FIG. 2 is an airbag which, in the inflated state, has the shape illustrated in FIGS. 1a to 1c with two chambers K1, K2. In this case, the first chamber K1 is bounded by an essentially bell-shaped covering part which is formed by the first fabric part 1 and is open on one side, and the second chamber K2 is bounded by a covering part 2 completely surrounding it, the second covering 2 at the same time forming a partition between the two chambers K1, K2.

Owing to the fact that the two coverings 1, 2 of the airbag are supported on each other in the region of their connecting seam 11u which, along the lower edge 10u of the first airbag part 1, annularly surrounds the partition forming a boundary surface G, this airbag arrangement has great stability, in particular with regard to an undesirable folding-over of one chamber with respect to the other chamber. As a result, the covering 1 of the first, upper chamber 1 is coupled in a sufficiently stiff manner to the covering 2 of the second, lower chamber K2, so that the first chamber K1 is held securely in its position. The shape and size of the two chambers K1, K2 are essentially independent of each other; all that is required is for the covering 2 of the second chamber K2 to form a partition between the two chambers K1, K2 in order to bound the first chamber K1 on the side on which the covering 1 thereof is open. The covering 2 of the second chamber K2 therefore supplements the covering 1 of the first chamber K1, which covering is open on one side, so that the first chamber K1 is also entirely enclosed by the associated covering 1, and part of the further covering 2.

Figure 3D:
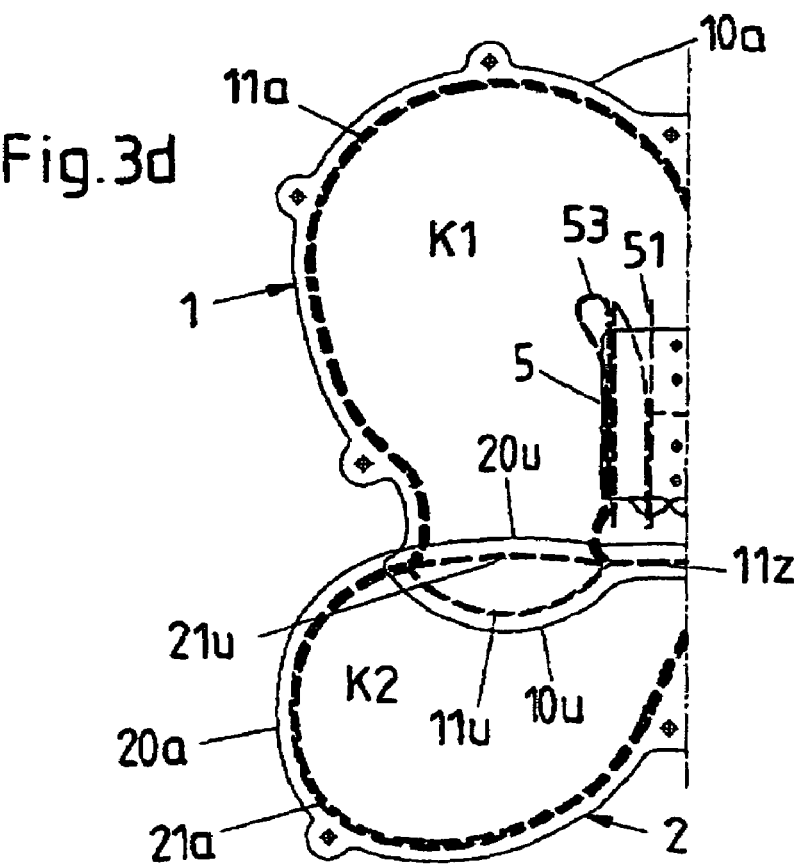

As an alternative to the working steps according to FIGS. 3c and 3d, the airbag cutting which is illustrated in FIG. 3b may also be cut through along the axis A (as an alternative to the folding around the axis A). The two airbag panels arising in this case would then have to be sewn along the entire outer edge, i.e. even at the edge along which they are connected integrally to each other according to FIGS. 3c and 3d.

Of the two fabric parts 5a, 5b which are provided for holding the gas generator one fabric part 5a is situated within and the other fabric part 5b outside the airbag. In this case, the gas generator, which is situated together with its connections outside the airbag, can protrude into the interior of the airbag through slots in the covering 1 of the first chamber K1 and of the other fabric part 5b.

An airbag of the type illustrated in FIGS. 1a to 1c is suitable, in particular, for use as a side airbag, the second, lower chamber K2, in the event of a crash, being filled with a greater internal pressure than the first, upper chamber K1. The lower chamber K2 can serve, in particular, for supporting the pelvis region of a vehicle occupant while the first, upper chamber is assigned in its lower half to the abdomen region and in its upper half to the thorax region of the occupant. In order to protect the head region of a vehicle occupant, it is possible, for example, for the first chamber K1 to be of upwardly correspondingly larger design, or a further, third covering is provided above the first chamber, which covering forms a further chamber as protection for the head. This further covering can be placed onto the covering 1 situated beneath it in a manner corresponding to how this covering 1 is placed onto the covering 2, which in turn is situated beneath it, and is connected thereto.

Figure 4A:
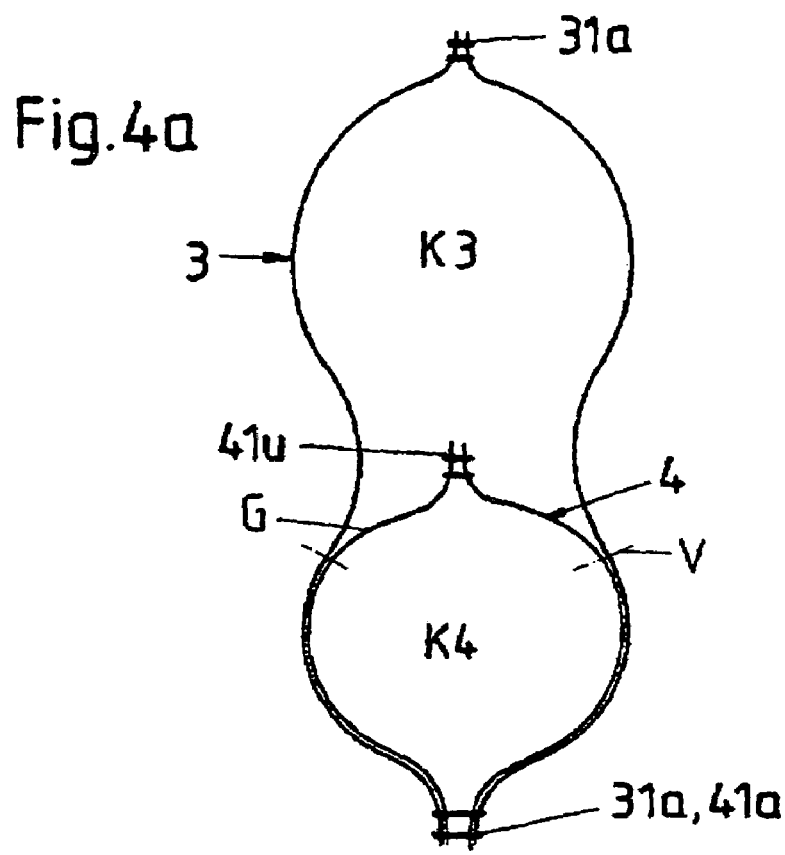
FIG. 4a shows a section through a second exemplary embodiment of an airbag having two chambers separated from each other.
Figure 4B:
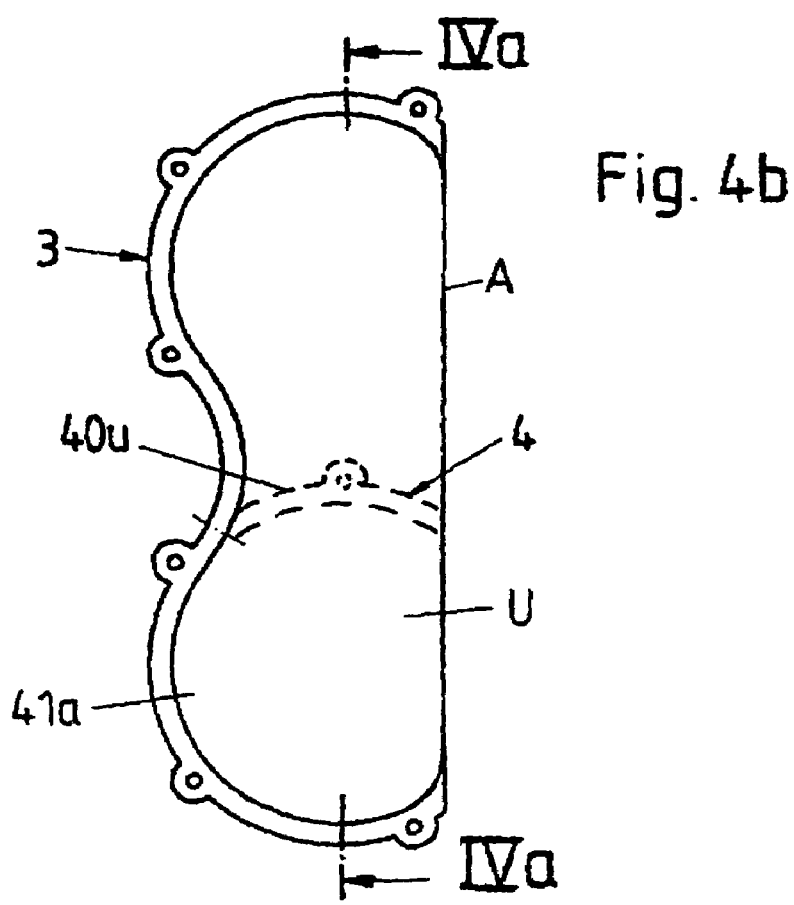

FIGS. 4a and 4b illustrate a modification of the airbag from FIGS. 1a to 1c, in which, in order to form a side airbag, a chamber K4, which is entirely surrounded by a covering 4, is arranged within a chamber K3, which is entirely surrounded by a further covering 3. In this case, one chamber K4 is situated with its covering 4 entirely within the region which is surrounded by the other covering 3 and defines the other chamber K3. The separation of the two chambers K3, K4 takes place by means of the covering 4 of one inner chamber K4.

In this exemplary embodiment too, a covering 3 surrounds an associated chamber K3 in a bell-shaped manner and, in the overlapping region of the two coverings 3, 4, is connected to the second covering 4 in such a manner that the connecting line annularly surrounds the partition (boundary surface G) between the two chambers K3, K4. In this case, the corresponding connecting line is formed only in part by a connecting seam 41z (compare FIG. 6b) and is predominantly formed by a connecting line V along which the chamber K4 forming the boundary surface G is pressed against the covering 3 of the hood- or bell-shaped chamber K3. For this purpose, the internal pressure in the chamber K4, which forms the boundary surface G and is entirely enclosed by its covering 4, is significantly greater than the internal pressure in the bell- or hood-shaped chamber K3.

In the case of the airbag illustrated in FIGS. 4a and 4b, when used as a side airbag, the one, lower chamber K4 serves to protect the pelvis region of a vehicle occupant and the other chamber K3 serves to protect the thorax and abdomen region of a vehicle occupant. Of course, it is also possible here, however, as in the previous exemplary embodiment, for the head region to be incorporated at the same time.

The airbag illustrated in FIGS. 4a and 4b can be produced from an airbag cutting shown in FIG. 5 by means of the method steps illustrated in FIGS. 6a to 6d.

The airbag cutting illustrated in FIG. 5 comprises two airbag parts 3, 4 which are formed symmetrically with respect to an axis A and which are situated one above the other in such a manner that one airbag part 4 rests entirely on the other airbag part 3. Expressed in other words, one airbag part 4 overlaps with a subregion of the other airbag part 3, but the first-mentioned airbag part 4 being entirely situated in the overlapping region of the two airbag parts 3, 4. The other airbag part 3 is accordingly of identical design in the overlapping region U to the first airbag part 4. Two fabric parts 6a, 6b, which are intended to form a holder 6 for a gas generator for inflating the corresponding airbag, are situated on the other airbag part 3, one fabric part 6a being arranged on the front side and the other being arranged on the rear side of the airbag part 3.

In a first working step, according to FIG. 6a, the rear fabric part 6b of the two fabric parts 6a, 6b, which serve as reinforcing and joining layers for holding the gas generator, is connected along inner longitudinal seams 61 to the associated airbag part. The two fabric parts 6a, 6b are subsequently together connected to the airbag part along two outer longitudinal seams 62.

In the second step, according to FIG. 6b, the one, lower airbag part 4 is connected along a subsection of its outer edge 40 to the other airbag part 3. This subsection forms the central section of that edge region 40u of one airbag part 4 which rests on the other airbag part 3 outside the edge of the latter. The connecting seam 41z which arises in this case extends precisely along that part of the edge region 40u which is covered by the fabric parts 6a, 6b of the holder 6 for a gas generator. By this means, the two airbag parts 3, 4 are connected to each other along a seam 41z which extends along part of that edge region 40u of one airbag part 4 which crosses the other airbag part 3.

Figure 6C:
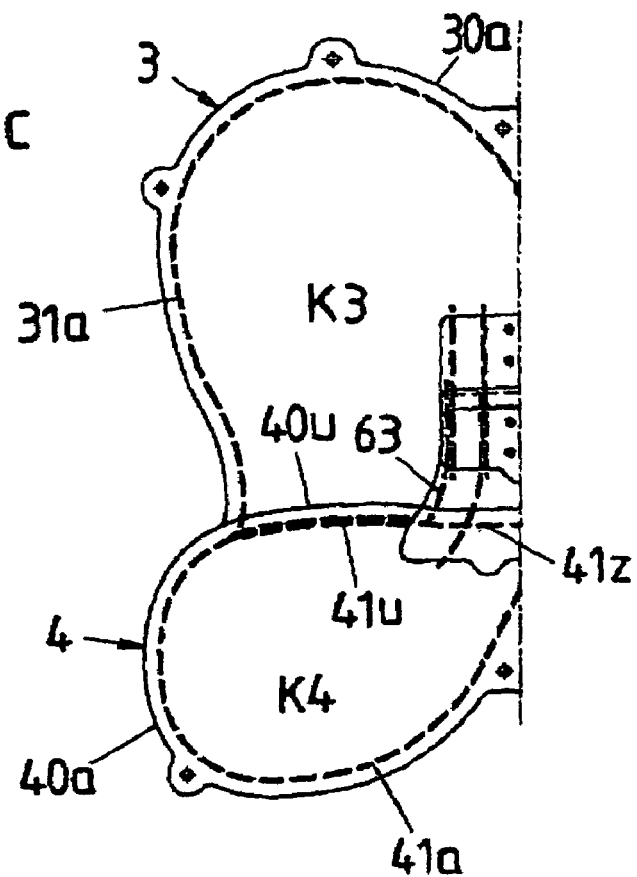
Figure 6D:
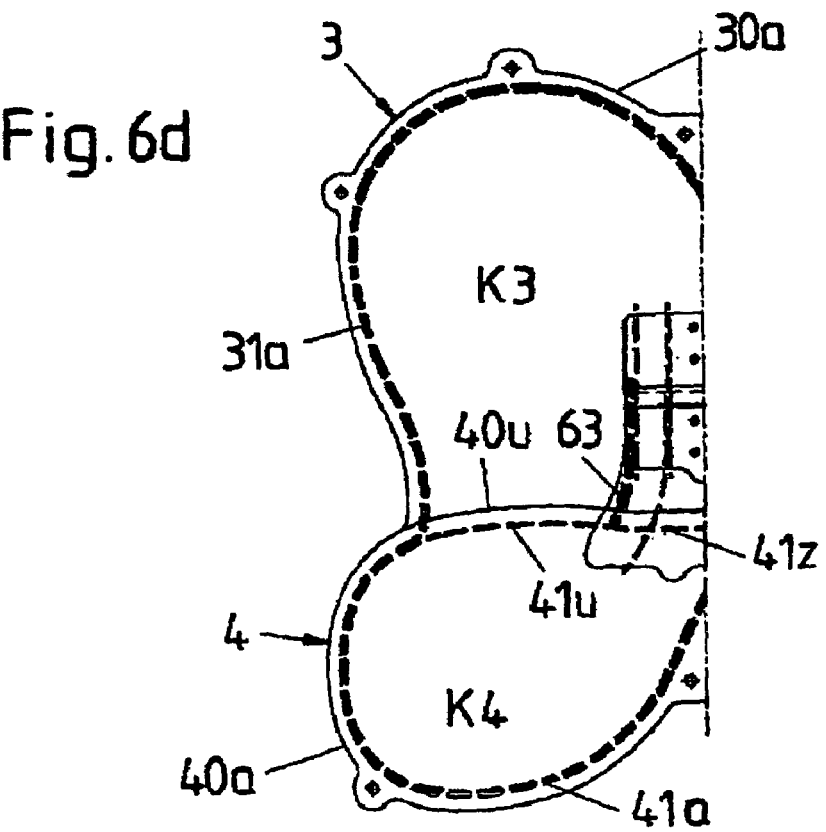

In the following step, the sections of the two fabric parts 3, 4, which sections are placed on both sides of the folding axis A, are folded together around the folding axis A and placed one on the other, cf. FIG. 6c. Furthermore, the upper fabric wing, which is formed in this case by the other airbag part 3, is folded away, so that the two sections of one airbag part 4, which sections lie one on the other, are now connected to each other by the formation of a seam 41u which, in the overlapping region of the two airbag parts 3, 4, adjoins the central seam 41z. In the region of the central seam 41z, along which the two airbag parts 3, 4 are connected to each other, but not the two sections of one airbag part 4, which sections are situated one above the other according to FIG. 6c, an opening therefore remains through which the holder 6 for the gas generator extends, so that gas from a gas generator accommodated there can be conducted into the two chambers K3, K4 of the airbag.

In the last working step, the airbag sections, which are situated one on the other, are now sewn along those subsections 30a, 40a of the edges 30, 40 of the two airbag parts 3, 4 which overall form the outer contour of the airbag. This gives rise to corresponding seams 31a, 41a running along the outer contour, cf. FIG. 6d.

Furthermore, an additional seam 63 is sewn on the holder 6 as a bearing means for the gas generator.

The inner chamber K4, which is surrounded both by one covering 4 and by the other, outer covering 3, is accordingly predominantly of double-walled design, with the result that it, as a particularly stable chamber, can be inflated with a comparatively great internal pressure, which is advantageous for protecting the pelvis region of a vehicle occupant. By contrast, the other, single-walled chamber K3 is loaded by a smaller internal pressure.

The airbag illustrated in FIGS. 4a and 4b is distinguished in comparison to the airbag illustrated in FIGS. 1a to 1c by simpler production, since the inverting of a fabric part which is required in the first exemplary embodiment in order to make an inner seam region accessible is omitted.

In both cases, it is advantageous that the production takes place using a spread-out, two-dimensional airbag cutting, with the airbag regions which are to be connected in each case being situated in a flat manner one above the other.

In the case of the airbag illustrated in FIGS. 4a and 4b, the inner covering 4 of one chamber K4 does not necessarily have to extend overall as far as the lower end of the airbag. On the contrary, the inner covering 4 may also be formed as a covering which only partially surrounds the associated chamber K4 and which serves essentially as a partition between the two chambers K3, K4. The corresponding seam 41a, via which this covering 4 would be sewn to the other covering 3, would then be correspondingly offset upward. The one chamber K4 would then also be of only essentially single-walled design, which is adequate in the case of a sufficiently small internal pressure required and leads to a saving on material.

In the case of the airbag arrangements illustrated in FIGS. 1a to 1c and 4a and 4b, in the inflated state of the airbag the internal pressure in the bell- or hood-shaped chamber K1 or K3 is in each case significantly smaller than in the other chamber K2 or K4 forming the particular boundary surface G. Owing to the significantly greater internal pressure in the chamber K2 or K4 forming in each case the boundary surface G. this chamber is pressed with its outer wall against the inner wall of the particular bell-shaped chamber K1 or K3.

In the case of the exemplary embodiment illustrated in FIGS. 1a to 1c, the significantly greater internal pressure in the lower chamber K2 acts in a supplementary manner to the connecting seam 11u in order to connect the two airbag parts 1, 2 along a connecting line, which encloses the boundary surface G, to each other and to support them on each other in a stable manner. By contrast, in the case of the exemplary embodiment illustrated in FIGS. 4a and 4b, a connecting seam which entirely encloses the boundary surface G is not provided, with the result that here the connecting line V, which encloses the boundary surface G, between the coverings 3, 4 of the two chambers K3, K4 is brought about in some sections solely by the correspondingly large internal pressure of the lower chamber K4 by means of which said chamber is pressed against the inner wall of the bell-shaped, outer chamber K3. The corresponding difference in pressure therefore brings about above all a fixed bearing of the covering 4 of the inner chamber K4 against the covering 3 of the outer chamber K3, since, in the overlapping region U, the airbag cuttings of the two airbag parts forming the covering are congruent (in particular equal in area), compare FIG. 5 and FIGS. 6a and 6b.

FIGS. 7a to 7f illustrate different exemplary embodiments of an airbag arrangement having a total of three airbag parts and accordingly three chambers which are separated from one another.

FIG. 7a shows a development of the airbag arrangement from FIGS. 1a to 3d, with a further bell-shaped chamber K1' being formed above the bell-shaped chamber K1 by means of an additional airbag part 1'. In this case, the two bell-shaped chambers K1', K1 are connected by seams in an identical manner to how the bell-shaped chamber K1 is connected to the chamber K2 which is entirely enclosed by the associated airbag part 2.

FIG. 7b shows a further modification of the airbag arrangement from FIGS. 1a to 3d, the difference being that that side of the bell-shaped chamber K1 which faces away from the one entirely closed chamber K2 is formed by a further, separate chamber K2 which is completely enclosed by its associated airbag part 2 as the covering.

In the case of the exemplary embodiment according to FIG. 7c, a bell-shaped chamber K1 is arranged in each case on mutually opposite sides of a chamber K2, which is entirely enclosed by its associated airbag part 2 as the covering, and is fastened there by means of a respective seam enclosing the corresponding boundary surface.

In the case of the airbag arrangements illustrated in FIGS. 7a to 7c, the internal pressure in the chambers K2 which are entirely enclosed by their associated airbag part 2 as the covering is in each case significantly greater than in the chambers K1 which are bounded by a bell-shaped covering 1. In the case of the exemplary embodiment according to FIG. 7a, the pressure in the hood-shaped chamber K1', which is spaced apart from the chamber K2 which is completely enclosed by its covering 2, is also smaller than the internal pressure in the central chamber K1.

Figure 7D:
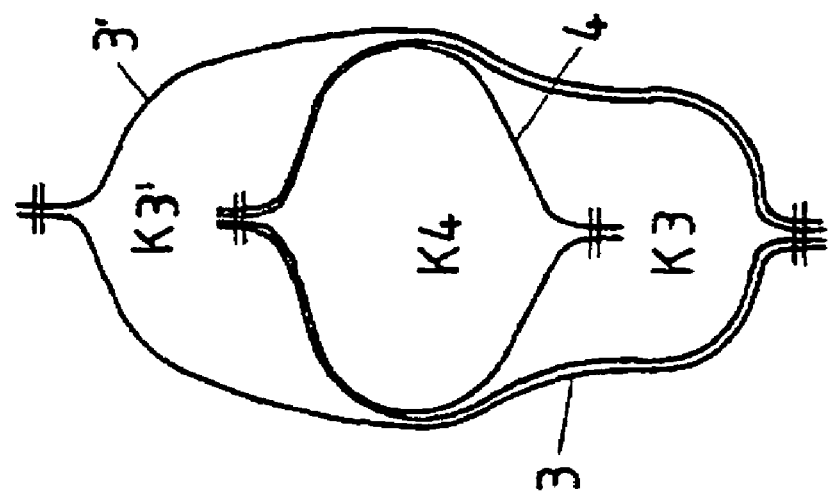
Figure 7E:
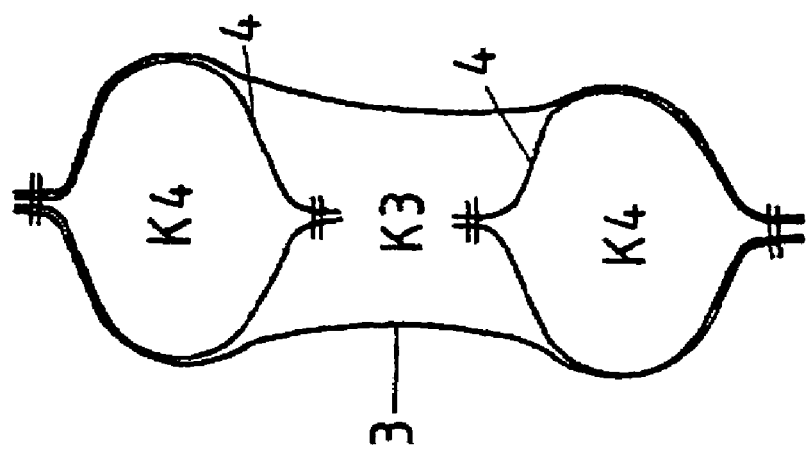
Figure 7F:
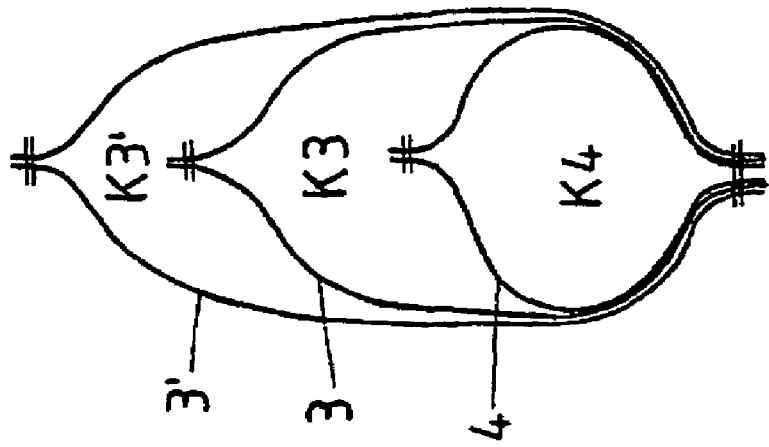

FIGS. 7d and 7f each show a modification of the airbag arrangement from FIGS. 4a to 6d, the bell-shaped chamber K3, which, with its outer covering 3, encloses an inner chamber K4, being surrounded in each case by the covering of a further, outermost, bell-shaped chamber K3', the covering of which is formed by an additional airbag part 3'.

In the case of the exemplary embodiment shown in FIG. 7e, the coverings of two further inner chambers K4, which coverings are formed by a respective airbag part 4' are arranged in an outer chamber K3.

In the case of the airbag arrangements illustrated in FIGS. 7d to 7f, the internal pressure in the chamber K4 which is entirely enclosed by its associated covering is in each case significantly greater than in the associated, bell-shaped chamber K3. The internal pressure thereof is in turn significantly greater, in the case of the exemplary embodiments according to FIGS. 7d and 7f, than the pressure of the chamber K3' formed by the outermost covering 3'.

What is claimed is:

1. A multipart airbag cutting for an airbag of an occupant protection device for motor vehicles, it being possible for the airbag to be produced by connecting the edges of the airbag cutting, comprising:
   at least two mutually overlapping airbag parts connected to each other in an overlapping region;
   a first airbag part, in the inflated state of the airbag, forming a covering which surrounds a first chamber of the airbag in a bell-shaped manner; and
   a second airbag part forming a covering which encloses a second chamber of the airbag and, in the overlapping region, forms a boundary surface between two chambers of the airbag, in the region of which surface the two coverings of the inflated airbag are supported on each other to stabilize the airbag.

2. The airbag cutting as claimed in claim 1, wherein the cutting is configured so that, in the inflated state of the airbag, one airbag part surrounds the first chamber in a bell or hood-shaped manner.

3. The airbag cutting as claimed in claim 1, wherein the boundary surface between the two chambers is formed by the second airbag part which, in the inflated state, surrounds the second chamber of the airbag.

4. The airbag cutting as claimed in claim 1, wherein the two airbag parts, in the inflated state of the airbag, are supported on each other in the overlapping region.

5. The airbag cutting as claimed in claim 1, wherein the two airbag parts are connected together in the overlapping region so that a connecting line, which annularly surrounds the boundary surface of the airbag in the inflated state, is formed, it being possible for the connecting line to be formed by one airbag part, in the inflated state of the airbag, being pressed on account of the internal pressure in the associated chamber at least along the connecting line toward the other airbag part which forms the covering for an associated chamber.

6. The airbag cutting as claimed in claim 1, wherein the cutting includes a folding axis about which the two airbag parts can be folded to create airbag sections, which lie one above the other after folding, that by connection of the airbag sections, an airbag having two chambers is formed.

7. The airbag cutting as claimed in claim 6, wherein the folding axis forms an axis of symmetry with respect to the airbag cutting, the two airbag parts preferably being formed symmetrically with respect to the folding axis.

8. The airbag cutting as claimed in claim 6, wherein the airbag sections, which lie one above the other after the airbag cutting has been folded over around the folding axis, are connected to each other only along the outer edges of the airbag parts, which edges form an outer contour of the entire airbag.

9. The airbag cutting as claimed in claim 8, wherein the airbag sections, which lie one above the other, are connected to each other along the entire outer contour of the airbag.

10. The airbag cutting as claimed in claim 1, wherein in the overlapping region of the two airbag parts, one airbag part, having an outer edge is connected along part of its outer edge to the other airbag part.

11. The airbag cutting as claimed in claim 10, comprising:
connecting points; and fastening points for connecting airbag parts,
wherein line-like connecting points, connecting one airbag part to the other airbag part are situated in the overlapping region so close to the outer edge of the first airbag part that no further fastening points are situated between the line-like connecting points and a corresponding region of the outer edge.

12. The airbag cutting as claimed in claim 11, wherein in the overlapping region, one airbag part is connected to the other airbag part in a region of the other airbag part which is situated outside the edge region of the other airbag part.

13. The airbag cutting as claimed in claim 12, wherein further fastening points for connecting airbag parts are situated between the connecting points of the other airbag part to the first airbag part and the outer edge of the other airbag part.

14. The airbag cutting as claimed in claim 10, wherein one airbag part is connected to the other airbag part along the entire outer edge that is situated in the overlapping region.

15. The airbag cutting as claimed in claim 10, wherein one airbag part is connected to the other airbag part only along a subsection of the outer edge that is situated in the overlapping region.

16. The airbag cutting as claimed in claim 15, wherein one airbag part is connected to the other airbag part only along a central subsection of the subsection of the outer edge, which is situated in the overlapping region.

17. The airbag cutting as claimed in claim 10, wherein a holder for a gas generator is fixed on at least one of the airbag parts.

18. The airbag cutting as claimed in claim 17, wherein the subsection of the outer edge of one airbag is situated in the overlapping region of the holder with the outer edge.

19. The airbag cutting as claimed in claim 17, wherein one airbag part is completely enclosed by the other airbag part.

20. The airbag cutting as claimed in claim 17, wherein one chamber of the airbag is completely enclosed by one airbag part and the other chamber of the airbag is enclosed by the other airbag part, part of the first airbag part additionally bounding the other chamber.

21. The airbag cutting as claimed in claim 20, wherein the two chambers are separated from each other by a section just of one airbag part.

22. The airbag cutting as claimed in claim 20, wherein the two chambers of the airbag are connected to each other by an opening in the partition between the two chambers.

23. The airbag cutting as claimed in claim 22, wherein the gas generator is to be arranged in the region of the opening.

24. The airbag cutting as claimed in claim 22, wherein the gas generator partially reaches through the opening.

25. The airbag cutting as claimed in claim 1, wherein the two airbag parts only partially overlap with the other airbag part.

26. The airbag cutting as claimed in claim 1, wherein one airbag part overlaps completely with the other airbag part.

27. The airbag cutting as claimed in claim 1, wherein the connections are formed by seams.

28. The airbag cutting as claimed in claim 1, wherein the two airbag parts are assigned to a chamber of the airbag as covering.

29. The airbag cutting as claimed in claim 1, wherein one airbag part serves to completely enclose one chamber of the airbag.

30. The airbag cutting as claimed in claim 29, wherein one airbag part only partially encloses one chamber of the airbag and is connected to the other airbag part in such a manner that the other airbag part together with the first airbag part completely encloses the one chamber.

31. The airbag cutting as claimed in claim 30, wherein one airbag part has an open side surface, along the edge of which it is connected to the other airbag part so that the other airbag part together with the first airbag part completely encloses the one chamber.

32. The airbag cutting as claimed in claim 1, wherein the airbag cutting is provided and designed for an airbag of a side airbag module.

33. The airbag cutting as claimed in claim 1, wherein different chambers of the airbag are provided for protecting different regions of the body, in particular of the upper body, of an occupant.

34. A method for producing an airbag from an airbag cutting comprising the steps of:
spreading out at least two airbag parts of the airbag so that they overlap each other;
connecting the airbag parts to each other in the overlapping region so that one airbag part forms a covering which encloses one chamber of the airbag and forms a boundary surface between at least two chambers of the airbag;
placing sections of the airbag cutting, which is composed of the airbag parts one above the other, so that they can be connected along the edge of the airbag cutting; and
connecting the airbag sections, which lie one above the other, to each other to form an airbag, so that, in the inflated state of the airbag, one airbag part forms a covering which surrounds one chamber of the airbag in a bell-shaped manner and being supported on the covering of the airbag, which covering is formed by the first-mentioned airbag part in the region of the boundary surface to stabilize the airbag.

35. The method as claimed in claim 34, wherein
a first airbag part is connected to a second airbag part along that section of its outer edge which is situated in the overlapping region of the at least two airbag parts;
the at least two connected airbag parts are folded once around a folding axis;
the subsections of the outer edge of the second airbag part, resting on each other in the overlapping region, are connected to each other; and
the sections of the at least two overlapping airbag parts, lying one above the other, are connected to each other along the entire outer contour of the edges.

36. The method as claimed in claim 34, wherein the two airbag parts are folded along a folding axis, so that airbag sections which were previously situated on both sides of the folding axis lie one above the other.

* * * * *